Jan. 12, 1926.

P. LITTLE, JR 1,569,511

CONVEYER BELT TRIPPER

Filed Feb. 11, 1924  3 Sheets-Sheet 1

INVENTOR
PHILIP LITTLE, JR.
BY
ATTORNEYS

Jan. 12, 1926. 1,569,511
P. LITTLE, JR
CONVEYER BELT TRIPPER
Filed Feb. 11, 1924 3 Sheets-Sheet 2

Inventor
PHILIP LITTLE, JR.
By Paul, Paul & Moore
ATTORNEYS

Jan. 12, 1926.  
P. LITTLE, JR  
1,569,511  
CONVEYER BELT TRIPPER  
Filed Feb. 11, 1924  
3 Sheets-Sheet 3

Inventor  
PHILIP LITTLE, JR.  
By Paul, Paul & Moore  
ATTORNEYS

Patented Jan. 12, 1926.

1,569,511

UNITED STATES PATENT OFFICE.

PHILIP LITTLE, JR., OF MINNEAPOLIS, MINNESOTA, ASSIGNOR TO STRONG-SCOTT MANUFACTURING COMPANY, OF MINNEAPOLIS, MINNESOTA, A CORPORATION OF MINNESOTA.

CONVEYER-BELT TRIPPER.

Application filed February 11, 1924. Serial No. 692,076.

*To all whom it may concern:*

Be it known that I, PHILIP LITTLE, Jr., a citizen of the United States, resident of Minneapolis, county of Hennepin, and State of Minnesota, have invented certain new and useful Improvements in Conveyer-Belt Trippers, of which the following is a specification.

In the operation of a flour mill or grain elevator or warehouse, it is customary to provide a conveyer belt of suitable length for transporting the grain or other material from place to place.

For the purpose of distributing the grain at intervals during its travel or discharging it from the conveyer belt a wheeled frame is usually provided through which the belt passes and contacts with suitable pulleys for driving the frame when it is desired to shift its position on the belt. A grain chute and distributing spouts are provided to receive the grain from the belt at the point where it enters the frame and a pipe connection is provided leading from the grain chute or from distributing spouts to an air trunk in which a suction is maintained for the purpose of removing the dust and light refuse material liberated from the grain or other material as it is discharged from the belt. It has been customary to set up the pipe leading to the air trunk manually each time the tripper is moved or its position changed and the separation is effected in a corresponding manner and the operator must also remember to close the valve of the intake leading to the air trunk when the pipe is separated therefrom. It sometimes happens, however, that the attendant attempts to move the tripper on the conveyer belt without first disconnecting the pipe and without closing the valve, forgetting to do this in the hurry of his work, with resulting damage to the apparatus. The purpose, therefore, of my present invention is to provide a construction which will automatically allow the separation of the pipe from the suction intake when the tripper is moved and movement of the tripper will also cause the automatic closing of the suction intake valve, thereby relieving the attendant entirely of the duty of remembering this duty whenever he desires to shift the position of the tripper on the belt. It is only necessary for him to adjust the mechanism for driving the tripper from one point to another and then set up his connection with the suction intake.

Other objects of the invention will appear from the following detailed description.

In the accompanying drawings forming part of this specification,

Figure 1:
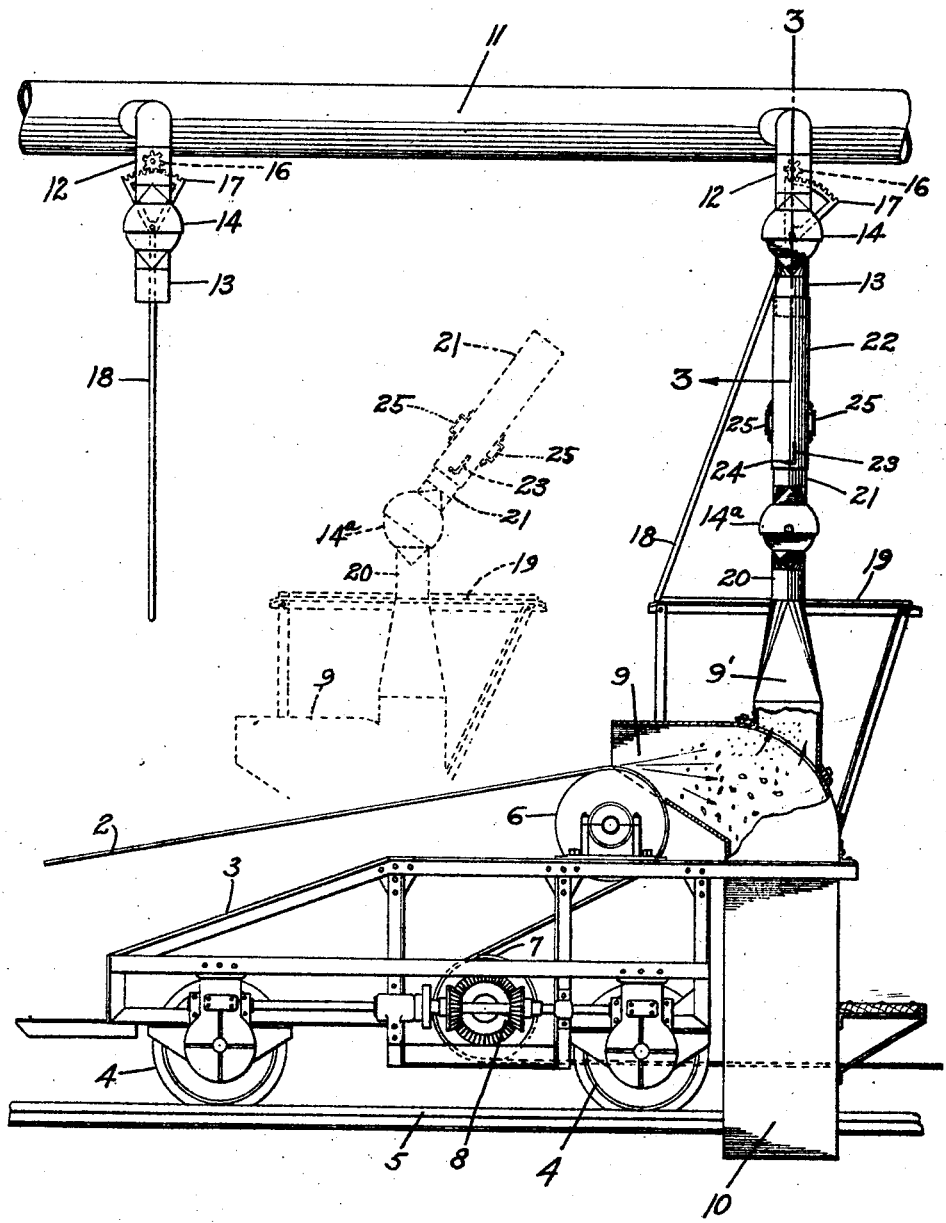
Figure 1 is a side elevation of a portion of a conveyer belt and tripper through which the belt passes showing the connection with the air trunk, a portion of the grain ducts being broken away to illustrate the manner of separating the dust from the material on the belt.
Figure 3:
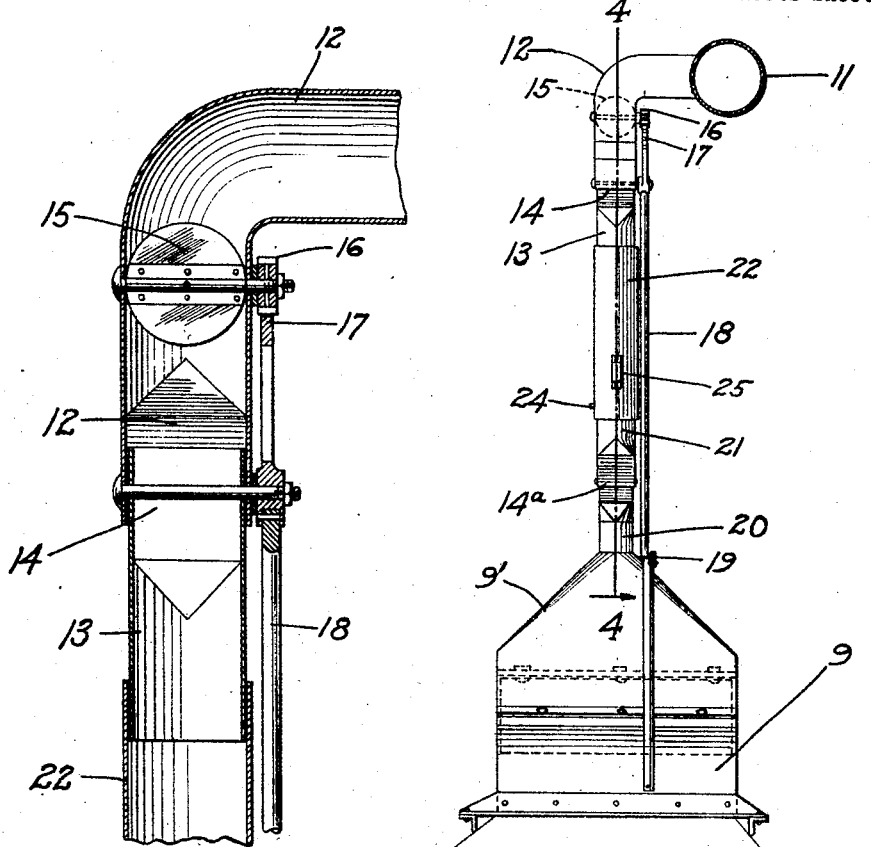
Figure 3 is a sectional view on the line 3—3 of Figure 1.
Figure 2:
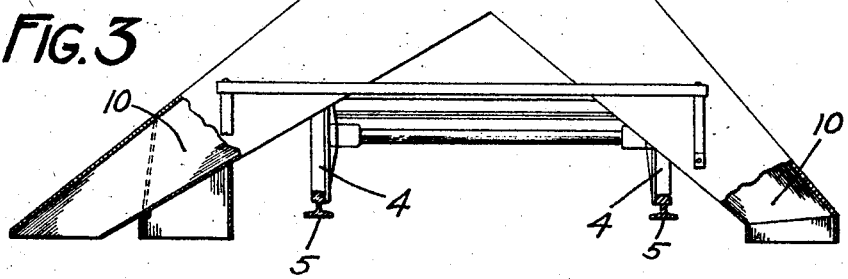
Figure 2 is an end view showing the position of the distributing spouts.

In the drawing, 2 represents a portion of conveyer belt adapted for transporting grain or other material from one point to another. This belt is generally used in mills, elevators, and warehouses and other places for distributing grain or other comminuted substances, and may be of any suitable length, provision being made for discharging the grain or substances at any point on the belt into suitable distributing spouts. The apparatus generally employed for effecting this removal of the material from the belt comprises a machine generally called a tripper consisting of a frame 3 having carrying wheels 4 adapted to run upon a track 5. Pulleys 6 and 7 are mounted in the machine frame, one above the other, and the belt passes around these pulleys and through the machine, and a clutch controlled driving mechanism may be provided within the control of the attendant with driving power transmitted from the conveying belt for moving the tripper by power from one distributing point to another.

Adjacent the pulley 6 is a chute 9 whereto the material is delivered as it passes around the pulley, beng projected into the chute by the momentum of the material as the belt passes over the top of the pulley. A trunk 9' is joined to the chute and projects upwardly therefrom. From this chute, suitable distributing spouts 10 extend downwardly to bin openings or other receptacles beneath. 11 represents a suction air trunk extending through the room occupied by the belt and above or to one side of the same and provided with a plurality of intake pipes 12 arranged at suitable intervals in the wall of the air trunk.

Figure 4:
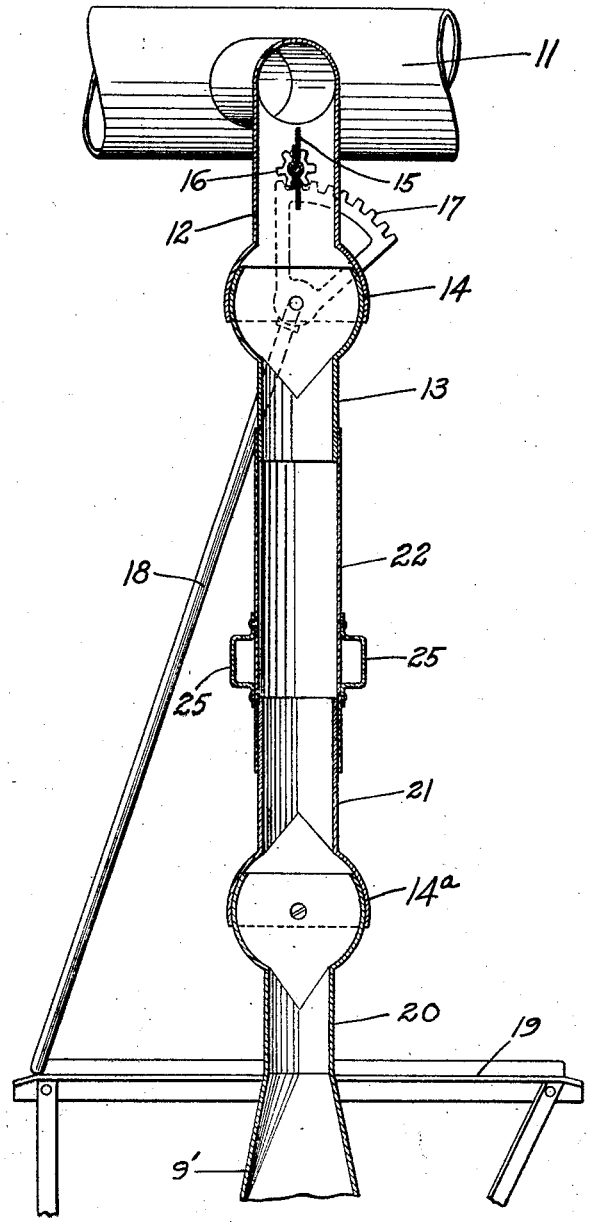
Figure 4 is a sectional view on the line 4—4 of Figure 2.
Figure 5:
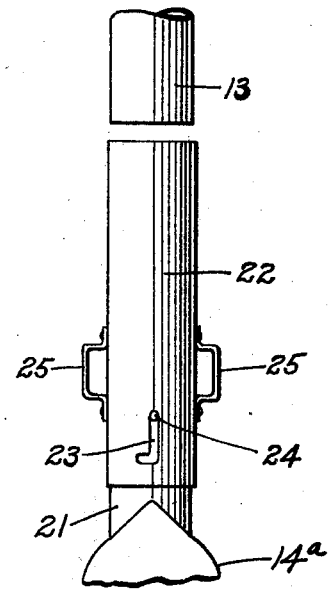
Figure 5 is a detail view showing the joint manipulated by the attendant in setting up the pipe connection and also illustrating how this joint is pulled away from its connection with the suction intake.

A pipe section 13 has a coupling forming an oscillating connection at 14 with the intake section 12 to allow the section 13 to rock back and forth with respect to the section 12 and adjust itself in different positions thereto. A valve 15 is mounted in the section 12 and has a pinion 16 thereon meshing with a quadrant 17 or other means of operating the valve that is pivoted in the wall of the section 13 and provided with a depending weighted rod 18 which normally tends to hang in a vertical position and close the intake opening to the suction pipe. A bar 19 is preferably mounted on the chute 9 in a position to contact with the lower end of the rod 18 and swing it to an inclined position shown in Figure 4, when connection is made between the chute and the intake 12 to open the passage to the suction trunk. A pipe section 20 is formed on the trunk 9' and has a coupling connection 14ª with a pipe section 21, and a pipe section 22 forms a coupling between the sections 13 and 21 and is preferably connected with the section 13 by means of a bayonet slot 23 and pin 24. Suitable handles 25 are preferably mounted on the section 22 for convenience in moving it on the sections 13 and 21. When the parts are in the position indicated by Figure 4 a direct pipe connection will be provided between the trunk 9 and the suction trunk 11 and the upward draft of air through the pipe sections will remove the dust and light foreign material from the grain or other substance and deliver it itno the suction pipe.

When the attendant wishes to move the tripper to another point on the conveyer belt he will shift one of the clutches controlling the driving mechanism 8 and start the tripper car forward or backward. The movement of the car in either direction will automatically cause a separation of the pipe sections; the section 22 being pulled out of contact with the section 13, thereby interrupting the flow of the air currents upwardly through the pipe sections to the air trunk and as soon as the bar 19 is moved out of the path of the rod 18 the latter will drop to a vertical position by gravity, and in so doing will turn the valve 15 to its closed position across the pipe, thereby closing the intake to the air trunk. When the tripper frame has been positioned opposite another intake on the air trunk at a point where it is desired to effect a distribution of the grain or other material on the belt, the attendant will manually join the pipe sections 13 and 22 together to form a continuous passage from the trunk 9 to the suction air trunk. When this has been done, a suction will again be established in the trunk 9 to lift the dust and fine material mingled with the grain therein and deposit it in the air trunk above.

I claim as my invention:

1. In combination a suction air trunk having a rigid metallic intake, a rigid metallic pipe joint supported for movement over a floor, connecting means between the pipe joint and the intake, said connecting means permitting the movement of said pipe joint transversely of said intake to automatically separate the pipe joint from the intake when the pipe joint and support are moved transversely of the intake.

2. In combination, a suction air trunk having intakes at intervals, a pipe joint and means for transporting the same over a floor, said pipe joint being adapted to be connected with any one of said intakes, means for connecting the pipe joint and intake, said means permitting the movement of said pipe joint by said transporting means transversely of said intakes and in its movements to automatically separate the pipe joint from one intake when it is moved transversely from one intake to the other.

3. In combination, a suction air trunk having intakes at intervals, a pipe joint adapted to be connected with any of said intakes, and means for moving the pipe joint transversely of the intakes, said pipe joint being adapted to be automatically disconnected as said means moves transversely from one intake to another and a closing means for each intake having means thereon automatically operated by the moving means to open the passage therethrough when said pipe joint is moved transversely to an intake.

4. In combination, a suction air trunk having intakes at intervals, and valves for normally closing said intakes, a pipe for connection with any one of asid intakes, and means for moving the pipe from one intake to another, said valves being arranged to be opened by said movable means when it is positioned to connect the pipe joint to an intake and arranged to close automatically when said moving means is moved to disconnect the pipe joint from an intake.

5. In combination, an air trunk having a plurality of suction intakes arranged at intervals and valves for closing said intakes, a suction pipe for connection with said air trunk intakes and provided with joints and pipe sections adapted to tilt when said pipe is moved from one suction intake to another, the sections of said pipe being separated automatically during said movement, and said valves having means actuated to open each one of them when said pipe is positioned for connection with each intake, and automatically return said valves to their closed positions when said pipe is moved from one intake to another.

6. In combination, an air trunk having a plurality of suction intakes arranged at intervals and valves for closing said intakes, a suction pipe with means for transporting it over a floor from one intake to another, said suction pipe having means adapting it to be set up manually for communication with any one of said air trunk intakes and means whereby the suction pipe may be separated from an intake by movement of the transporting means horizontally over the floor from one intake to another.

7. An air trunk having a plurality of suction intakes arranged at intervals and valves for closing and opening said intakes, a suction pipe with means for transporting it over a floor from one intake to another, said suction pipe having means adapting it to be set up manually for communication with any one of said air trunk intakes, and means whereby the suction pipe may be separated from an intake by the movement of the transporting means over the floor from one intake to another and means for automatically closing the valve for such intake when said pipe transporting means is moved therefrom.

In witness whereof, I have hereunto set my hand this 8th day of February, 1924.

PHILIP LITTLE, Jr.